US012751895B2

(12) United States Patent
Joshi et al.

(10) Patent No.: US 12,751,895 B2
(45) **Date of Patent: *Oct. 6, 2026**

(54) AUTOMATED CHEST COMPRESSION DEVICE

(71) Applicant: ZOLL Circulation, Inc., San Jose, CA (US)

(72) Inventors: Nikhil S Joshi, San Jose, CA (US); Melanie L Harris, Santa Clara, CA (US); Byron J Reynolds, Gilroy, CA (US)

(73) Assignee: ZOLL Medical Corporation, Chelmsford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/668,856

(22) Filed: May 20, 2024

(65) Prior Publication Data

US 2024/0390224 A1 Nov. 28, 2024

Related U.S. Application Data

(63) Continuation of application No. 18/337,159, filed on Jun. 19, 2023, now abandoned, which is a (Continued)

(51) Int. Cl.
*A61H 31/00* (2006.01)
*A61H 11/00* (2006.01)

(52) U.S. Cl.
CPC ...... *A61H 31/006* (2013.01); *A61H 2011/005* (2013.01); *A61H 31/005* (2013.01); *A61H 2201/018* (2013.01); *A61H 2201/1445* (2013.01); *A61H 2201/1604* (2013.01); *A61H 2201/1623* (2013.01); *A61H 2201/501* (2013.01); *A61H 2201/5043* (2013.01);
(Continued)

(58) Field of Classification Search
CPC ................ A61H 31/005; A61H 31/006; A61H 2011/005; A61H 2201/1619; A61H 2201/501; A61H 2201/5043; A61H 2201/5061; A61H 2201/5064; A61H 31/007; A61H 2031/001; A61H 2031/002; A61H 31/008; A61H 31/02; A61H 2031/025; A61H 31/004; A61H 2031/003
See application file for complete search history.

(56) References Cited

U.S. PATENT DOCUMENTS 443,204 A 12/1890 Davis
651,962 A 6/1900 Boghean
(Continued)

FOREIGN PATENT DOCUMENTS

CN 101394883 A 3/2009
CN 104717951 A 6/2015
(Continued)

OTHER PUBLICATIONS

Supplementary European Search Report dated Feb. 27, 2019 in EP Publication No. 3362026.
(Continued)

*Primary Examiner* — Tu A Vo
(74) *Attorney, Agent, or Firm* — ZOLL Medical Corporation

(57) ABSTRACT

A device for compressing the chest of a cardiac arrest victim.

8 Claims, 6 Drawing Sheets

Related U.S. Application Data continuation of application No. 16/856,863, filed on Apr. 23, 2020, now Pat. No. 11,723,833, which is a continuation of application No. 14/885,952, filed on Oct. 16, 2015, now Pat. No. 10,639,234.

(52) U.S. Cl.
CPC ................ *A61H 2201/5061* (2013.01); *A61H 2201/5064* (2013.01)

(56) References Cited

U.S. PATENT DOCUMENTS 1,854,713 A 4/1932 Miller
1,953,424 A 4/1934 Miller
2,071,215 A 2/1937 Petersen
2,255,684 A 9/1941 Smith
2,486,667 A 11/1949 Meister
2,699,163 A 1/1955 Engstrom
2,754,817 A 7/1956 Nemeth
2,780,222 A 2/1957 Polzin et al.
2,853,998 A 9/1958 Emerson
2,899,955 A 8/1959 Huxley, III et al.
2,910,264 A 10/1959 Lindenberger
3,042,024 A 7/1962 Mendelson
3,095,873 A 7/1963 Edmunds, Jr.
3,120,228 A 2/1964 Huxley, III
3,359,851 A 12/1967 Lipschutz et al.
3,368,550 A 2/1968 Glascock
3,374,783 A 3/1968 Hurvitz
3,461,860 A 8/1969 Barkalow
3,461,861 A 8/1969 Barkalow et al.
3,481,327 A 12/1969 Drennen
3,503,388 A 3/1970 Cook
3,514,065 A 5/1970 Litt et al.
3,586,760 A 6/1971 Dillenburger
3,718,751 A 2/1973 Broemmelsiek et al.
3,748,471 A 7/1973 Ross et al.
3,753,822 A 8/1973 Heinrich
3,777,744 A 12/1973 Fryfogle et al.
3,782,371 A 1/1974 Derouineau
3,802,638 A 4/1974 Dragan
3,822,840 A 7/1974 Stephenson
3,835,847 A 9/1974 Smith
3,896,797 A 7/1975 Bucur
3,902,480 A 9/1975 Wilson
4,004,579 A 1/1977 Dedo
4,058,124 A 11/1977 Yen et al.
4,155,537 A 5/1979 Bronson et al.
4,185,902 A 1/1980 Plaot
4,241,675 A 12/1980 Bardsley
4,241,676 A 12/1980 Parsons et al.
4,273,114 A 6/1981 Barkalow et al.
4,291,686 A 9/1981 Miyashiro
4,315,906 A 2/1982 Gelder
4,338,924 A 7/1982 Bloom
4,349,015 A 9/1982 Alferness
4,365,623 A 12/1982 Wilhelm et al.
4,397,306 A 8/1983 Weisfeldt et al.
4,409,614 A 10/1983 Eichler et al.
4,424,806 A 1/1984 Newman et al.
4,453,538 A 6/1984 Whitney
4,471,898 A 9/1984 Parker
4,477,807 A 10/1984 Nakajima et al.
4,491,078 A 1/1985 Ingram
4,522,132 A 6/1985 Slattery
4,540,427 A 9/1985 Helbling
4,570,615 A 2/1986 Barkalow
4,619,265 A 10/1986 Morgan et al.
4,655,312 A 4/1987 Frantom et al.
4,664,098 A 5/1987 Woudenberg et al.
4,739,717 A 4/1988 Bardsley
4,753,226 A 6/1988 Zheng et al.
4,770,164 A * 9/1988 Lach .................... A61H 31/008 601/41
4,827,334 A 5/1989 Johnson et al.
4,835,777 A 5/1989 Deluca et al.
4,915,095 A 4/1990 Chun
4,928,674 A 5/1990 Halperin et al.
4,930,517 A 6/1990 Cohen et al.
4,987,783 A 1/1991 Nicholas et al.
5,014,141 A 5/1991 Gervais et al.
5,025,794 A 6/1991 Albert et al.
5,043,718 A 8/1991 Shimura
5,056,505 A 10/1991 Warwick et al.
5,075,684 A 12/1991 Deluca
5,093,659 A 3/1992 Yamada
5,098,369 A 3/1992 Heilman et al.
5,140,561 A 8/1992 Miyashita et al.
5,184,606 A 2/1993 Csorba
5,217,010 A 6/1993 Tsitlik et al.
5,222,478 A 6/1993 Scarberry et al.
5,228,449 A 7/1993 Christ et al.
5,257,619 A 11/1993 Everett
5,262,958 A 11/1993 Chui et al.
5,277,194 A 1/1994 Hosterman et al.
5,287,846 A * 2/1994 Capjon ................ A61H 31/008 601/44
5,295,481 A 3/1994 Geeham
5,318,262 A 6/1994 Adams
5,327,887 A 7/1994 Nowakowski
5,359,999 A 11/1994 Kinsman
5,370,603 A 12/1994 Newman
5,372,487 A 12/1994 Pekar
5,399,148 A 3/1995 Waide et al.
5,402,520 A 3/1995 Schnitta
5,405,362 A 4/1995 Kramer et al.
5,411,518 A 5/1995 Goldstein et al.
5,421,342 A 6/1995 Mortara
5,451,202 A 9/1995 Miller et al.
5,474,533 A 12/1995 Ward et al.
5,474,574 A 12/1995 Payne et al.
5,490,820 A 2/1996 Schock et al.
5,496,257 A 3/1996 Kelly
5,513,649 A 5/1996 Gevins et al.
5,520,622 A 5/1996 Bastyr et al.
5,524,843 A 6/1996 McCauley
5,582,580 A 12/1996 Buckman, Jr. et al.
5,593,426 A 1/1997 Morgan et al.
5,620,001 A 4/1997 Byrd et al.
5,630,789 A 5/1997 Schock
5,660,182 A 8/1997 Kuroshaki et al.
5,664,563 A 9/1997 Schroeder et al.
5,704,365 A 1/1998 Albrecht et al.
5,738,637 A * 4/1998 Kelly ................... A61H 31/008 601/44
5,743,864 A 4/1998 Baldwin, II
5,769,800 A 6/1998 Gelfand et al.
5,806,512 A 9/1998 Abramov et al.
5,831,164 A 11/1998 Reddi et al.
5,860,706 A 1/1999 Fausel
5,876,350 A 3/1999 Lo et al.
5,978,693 A 11/1999 Hamilton et al.
5,999,852 A 12/1999 Elabbady et al.
6,016,445 A 1/2000 Baura
6,066,106 A 5/2000 Sherman et al.
6,090,056 A * 7/2000 Bystrom .............. A61H 31/004 379/38
6,125,299 A 9/2000 Groenke et al.
6,142,962 A * 11/2000 Mollenauer .......... A61H 31/006 601/44
6,171,267 B1 1/2001 Baldwin, II
6,174,295 B1 1/2001 Cantrell et al.
6,213,960 B1 4/2001 Sherman et al.
6,234,984 B1 5/2001 Kelly et al.
6,263,238 B1 7/2001 Brewer et al.
6,306,107 B1 10/2001 Myklebust et al.
6,344,623 B1 2/2002 Yamazaki et al.
6,360,602 B1 3/2002 Tazartes et al.
6,366,811 B1 4/2002 Carlson
6,367,478 B1 4/2002 Riggs
6,390,996 B1 5/2002 Halperin et al.
6,398,744 B2 * 6/2002 Bystrom .............. A61N 1/0492 601/44

(56) References Cited

U.S. PATENT DOCUMENTS

| | | | | |
|---|---|---|---|---|
| 6,398,745 | B1 | 6/2002 | Sherman et al. | |
| 6,411,843 | B1 | 6/2002 | Zarychta | |
| 6,447,465 | B1 * | 9/2002 | Sherman | A61H 31/005 601/44 |
| 6,453,272 | B1 | 9/2002 | Slechta | |
| 6,599,258 | B1 | 7/2003 | Bystrom et al. | |
| 6,616,620 | B2 * | 9/2003 | Sherman | A61H 31/005 601/44 |
| 6,640,134 | B2 | 10/2003 | Raymond et al. | |
| 6,647,287 | B1 | 11/2003 | Peel, III et al. | |
| 6,676,613 | B2 * | 1/2004 | Cantrell | A61H 31/00 601/44 |
| 6,690,616 | B1 | 2/2004 | Bahr et al. | |
| 6,709,410 | B2 | 3/2004 | Sherman et al. | |
| 6,807,442 | B1 | 10/2004 | Myklebust et al. | |
| 6,869,408 | B2 | 3/2005 | Sherman et al. | |
| 6,939,314 | B2 * | 9/2005 | Hall | A61H 31/005 604/44 |
| 6,939,315 | B2 * | 9/2005 | Sherman | A61N 1/3968 601/44 |
| 7,008,388 | B2 * | 3/2006 | Sherman | A61H 31/005 601/44 |
| 7,056,296 | B2 * | 6/2006 | Sherman | A61H 31/005 601/44 |
| 7,104,967 | B2 | 9/2006 | Rothman et al. | |
| 7,108,665 | B2 | 9/2006 | Halperin et al. | |
| 7,122,014 | B2 | 10/2006 | Palazzolo et al. | |
| 7,131,953 | B2 * | 11/2006 | Sherman | A61H 31/00 601/44 |
| 7,220,235 | B2 | 5/2007 | Geheb et al. | |
| 7,226,427 | B2 | 6/2007 | Steen | |
| 7,270,639 | B2 * | 9/2007 | Jensen | A61H 31/00 601/41 |
| 7,347,832 | B2 * | 3/2008 | Jensen | A61H 31/008 601/41 |
| 7,354,407 | B2 | 4/2008 | Quintana et al. | |
| 7,374,548 | B2 | 5/2008 | Sherman et al. | |
| 7,404,803 | B2 | 7/2008 | Katz et al. | |
| 7,410,470 | B2 * | 8/2008 | Escudero | A61H 31/005 601/41 |
| 7,429,250 | B2 | 9/2008 | Halperin et al. | |
| 7,442,173 | B1 * | 10/2008 | Mollenauer | A61H 31/005 601/41 |
| 7,517,325 | B2 | 4/2009 | Halperin | |
| 7,569,021 | B2 | 8/2009 | Sebelius et al. | |
| 7,602,301 | B1 | 10/2009 | Stirling et al. | |
| 7,666,153 | B2 | 2/2010 | Hall et al. | |
| 7,841,996 | B2 | 11/2010 | Sebelius et al. | |
| 8,062,239 | B2 | 11/2011 | Sherman et al. | |
| 8,092,404 | B2 | 1/2012 | Kelly et al. | |
| 8,114,035 | B2 * | 2/2012 | Quintana | A61H 31/006 601/41 |
| 8,641,647 | B2 | 2/2014 | Illindala et al. | |
| 8,690,804 | B2 | 4/2014 | Nilsson et al. | |
| 8,740,823 | B2 | 6/2014 | Quintana et al. | |
| 8,753,298 | B2 | 6/2014 | Sebelius et al. | |
| 8,777,879 | B2 | 7/2014 | Johnson | |
| 9,517,176 | B2 | 12/2016 | Lach | |
| 10,179,087 | B2 | 1/2019 | Sebelius et al. | |
| 10,639,234 | B2 * | 5/2020 | Joshi | A61H 31/006 |
| 11,723,833 | B2 * | 8/2023 | Joshi | A61H 31/006 601/41 |
| 2001/0011159 | A1 | 8/2001 | Cantrell et al. | |
| 2001/0018562 | A1 | 8/2001 | Sherman et al. | |
| 2001/0047140 | A1 | 11/2001 | Freeman | |
| 2002/0026131 | A1 | 2/2002 | Halperin | |
| 2002/0055694 | A1 | 5/2002 | Halperin et al. | |
| 2002/0077560 | A1 | 6/2002 | Kramer et al. | |
| 2002/0088893 | A1 | 7/2002 | Nichols | |
| 2002/0133197 | A1 | 9/2002 | Snyder et al. | |
| 2002/0147534 | A1 | 10/2002 | Delcheccolo et al. | |
| 2002/0177793 | A1 * | 11/2002 | Sherman | A61H 31/006 601/41 |

| | | | | |
|---|---|---|---|---|
| 2003/0004445 | A1 * | 1/2003 | Hall | A61H 31/006 601/44 |
| 2003/0171661 | A1 | 9/2003 | Tong | |
| 2003/0181834 | A1 | 9/2003 | Sebelius et al. | |
| 2004/0030271 | A1 * | 2/2004 | Sherman | A61H 31/00 601/44 |
| 2004/0087839 | A1 | 5/2004 | Raymond et al. | |
| 2004/0116840 | A1 | 6/2004 | Cantrell et al. | |
| 2004/0162510 | A1 | 8/2004 | Jayne et al. | |
| 2004/0162587 | A1 * | 8/2004 | Hampton | A61N 1/39044 601/44 |
| 2004/0210172 | A1 | 10/2004 | Palazzolo et al. | |
| 2004/0220501 | A1 | 11/2004 | Kelly et al. | |
| 2005/0080360 | A1 | 4/2005 | Katz et al. | |
| 2005/0080363 | A1 * | 4/2005 | Jensen | A61H 31/00 601/44 |
| 2005/0080364 | A1 | 4/2005 | Jensen et al. | |
| 2005/0096570 | A1 * | 5/2005 | Palazzolo | A61H 31/008 601/44 |
| 2006/0180146 | A1 | 8/2006 | Thompson et al. | |
| 2007/0010764 | A1 | 1/2007 | Palazzolo et al. | |
| 2007/0270725 | A1 | 11/2007 | Sherman et al. | |
| 2007/0276298 | A1 | 11/2007 | Sebelius et al. | |
| 2008/0119766 | A1 | 5/2008 | Havardsholm et al. | |
| 2008/0146975 | A1 | 6/2008 | Ho et al. | |
| 2008/0300518 | A1 | 12/2008 | Bowes | |
| 2009/0020403 | A1 | 1/2009 | Scerri et al. | |
| 2009/0187123 | A1 * | 7/2009 | Hwang | A61H 31/006 601/41 |
| 2009/0204035 | A1 | 8/2009 | Mollenauer et al. | |
| 2009/0204036 | A1 | 8/2009 | Halperin | |
| 2009/0260637 | A1 | 10/2009 | Sebelius et al. | |
| 2010/0004571 | A1 | 1/2010 | Nilsson et al. | |
| 2010/0004572 | A1 | 1/2010 | King | |
| 2010/0063425 | A1 | 3/2010 | King et al. | |
| 2010/0113990 | A1 | 5/2010 | Chang | |
| 2010/0174216 | A1 * | 7/2010 | Jensen | A61H 31/008 601/41 |
| 2010/0185127 | A1 | 7/2010 | Nilsson et al. | |
| 2010/0198118 | A1 * | 8/2010 | Itnati | A61H 31/006 601/41 |
| 2011/0040217 | A1 | 2/2011 | Centen | |
| 2011/0201979 | A1 | 8/2011 | Voss et al. | |
| 2011/0319797 | A1 | 12/2011 | Sebelius et al. | |
| 2012/0083720 | A1 | 4/2012 | Centen et al. | |
| 2012/0143106 | A1 * | 6/2012 | Quintana | A61H 31/006 601/41 |
| 2012/0226205 | A1 | 9/2012 | Sebelius et al. | |
| 2012/0238922 | A1 | 9/2012 | Stemple et al. | |
| 2012/0274280 | A1 | 11/2012 | Yip et al. | |
| 2012/0274395 | A1 | 11/2012 | Deam | |
| 2012/0276428 | A1 | 11/2012 | Pendry | |
| 2012/0277642 | A1 | 11/2012 | Smith et al. | |
| 2012/0283608 | A1 | 11/2012 | Nilsson et al. | |
| 2013/0060172 | A1 | 3/2013 | Palazzolo et al. | |
| 2013/0060173 | A1 | 3/2013 | Palazzolo et al. | |
| 2013/0072830 | A1 * | 3/2013 | Illindala | A61H 31/006 601/41 |
| 2013/0079688 | A1 | 3/2013 | Ho et al. | |
| 2013/0123673 | A1 * | 5/2013 | Sherman | A61H 31/005 601/41 |
| 2013/0218055 | A1 | 8/2013 | Fossan | |
| 2013/0310718 | A1 | 11/2013 | Paul et al. | |
| 2013/0324894 | A1 * | 12/2013 | Herken | A61H 31/006 601/41 |
| 2014/0052032 | A1 | 2/2014 | Freeman et al. | |
| 2014/0121576 | A1 | 5/2014 | Nilsson et al. | |
| 2014/0155793 | A1 | 6/2014 | Illindala et al. | |
| 2014/0180180 | A1 | 6/2014 | Nilsson et al. | |
| 2014/0236054 | A1 | 8/2014 | Jensen et al. | |
| 2014/0276269 | A1 * | 9/2014 | Illindala | A61H 31/004 601/41 |
| 2014/0303530 | A1 | 10/2014 | Nilsson et al. | |
| 2014/0343466 | A1 | 11/2014 | Herken et al. | |
| 2015/0057580 | A1 | 2/2015 | Illindala | |
| 2015/0094624 | A1 | 4/2015 | Illindala | |

(56) References Cited

U.S. PATENT DOCUMENTS

| | | | |
|---|---|---|---|
| 2015/0105705 | A1 | 4/2015 | Freeman |
| 2015/0148717 | A1 | 5/2015 | Halperin |
| 2016/0242996 | A1 | 8/2016 | Von Schenck et al. |

FOREIGN PATENT DOCUMENTS

| | | |
|---|---|---|
| CN | 108430427 | 8/2018 |
| EP | 3362026 | 8/2018 |
| JP | 2018530403 | 10/2018 |
| WO | 9722327 | 6/1997 |
| WO | 0215836 | 2/2002 |
| WO | 2012060484 | 10/2012 |
| WO | 2014039383 | 3/2014 |
| WO | 2017066685 | 4/2017 |

OTHER PUBLICATIONS

International Search Report and Written Opinion for International Application No. PCT/US2016/057198 mailed Feb. 16, 2017.

International Preliminary Report on Patentability issued in International Application No. PCT/US2016/057198 on Apr. 17, 2018.

European Extended Search Report for European application No. 21198916.5, mailed on Dec. 6, 2021, 7 pages.

BlueJFilms, "A Quick Instruction of the AutoPulse", Jul. 7, 2012, <https://www.youtube.com/watch?v=Kvs8LNXnNLg>.

* cited by examiner

AUTOMATED CHEST COMPRESSION DEVICE

CROSS-REFERENCE TO RELATED APPLICATION(S)

This is a continuation of U.S. patent application Ser. No. 18/337,159, filed on Jun. 19, 2023, which is a continuation of U.S. patent application Ser. No. 16/856,863, filed on Apr. 23, 2020, now U.S. Pat. No. 11,723,833, which is a continuation of U.S. patent application Ser. No. 14/885,952, filed on Oct. 16, 2015, now U.S. Pat. No. 10,639,234. The entire disclosure of each application is incorporated herein by reference.

FIELD OF THE INVENTIONS

The inventions described below relate to the field of CPR.

BACKGROUND OF THE INVENTIONS

Cardiopulmonary resuscitation (CPR) is a well-known and valuable method of first aid used to resuscitate people who have suffered from cardiac arrest. CPR requires repetitive chest compressions to squeeze the heart and the thoracic cavity to pump blood through the body. In efforts to provide better blood flow and increase the effectiveness of bystander resuscitation efforts, various mechanical devices have been proposed for performing CPR. In one variation of such devices, a belt is placed around the patient's chest and the belt is used to effect chest compressions, for example our commercial device, sold under the trademark AUTOPULSE®. Our own patents, Mollenauer, et al., Resuscitation Device Having A Motor Driven Belt To Constrict/Compress The Chest, U.S. Pat. No. 6,142,962 (Nov. 7, 2000); Sherman, et al., CPR Assist Device with Pressure Bladder Feedback, U.S. Pat. No. 6,616,620 (Sep. 9, 2003); Sherman, et al., Modular CPR assist device, U.S. Pat. No. 6,066,106 (May 23, 2000); and Sherman, et al., Modular CPR assist device, U.S. Pat. No. 6,398,745 (Jun. 4, 2002); Jensen, Lightweight Electro-Mechanical Chest Compression Device, U.S. Pat. No. 7,347,832 (Mar. 25, 2008) and Quintana, et al., Methods and Devices for Attaching a Belt Cartridge to a Chest Compression Device, U.S. Pat. No. 7,354,407 (Apr. 8, 2008), show chest compression devices that compress a patient's chest with a belt. Each of these patents is hereby incorporated by reference in their entirety.

These devices have proven to be valuable alternatives to manual CPR, and evidence is mounting that they provide circulation superior to that provided by manual CPR, and also result in higher survival rates for cardiac arrest victims. The devices provide Chest compressions at resuscitative rates and depths. A resuscitative rate may be any rate of compressions considered effective to induce blood flow in a cardiac arrest victim, typically 60 to 120 compressions per minute (the CPR Guidelines 2010 recommends 80 to 100 compression per minute), and a resuscitative depth may be any depth considered effective to induce blood flow, and typically 1.5 to 2.5 inches (the CPR Guidelines 2010 recommends about 2 inches per compression).

The AUTOPULSE® chest compression device uses a belt, which is releasably attached to a drive spool with the housing of the device. In a convenient arrangement, a spline is secured to the belt, and the spline fits into a slot in the drive spool of the device. The drive spool is accessible from the bottom, or posterior aspect, of the device. Before use, a fresh belt is fitted to the device, and this requires lifting the device to insert the spline into the drive spool. The patient is then placed on the housing of the device, and the belt is secured over the chest of the patient. Opposite ends of the belt are held together, over the chest of the patient, with hook and loop fasteners. The arrangement has proven effective for treating cardiac arrest victims and convenient to use. Other belt-based CPR compressions devices have been proposed, but not implemented in clinical use. Lach, Resuscitation Method and Apparatus, U.S. Pat. No. 4,770,164 (Sep. 13, 1988) secures a belt around a patient by threading it under a first roller, then under a second roller, over the patient, back under the first roller, and then to a large roller disposed on one side of the patient. The belt is secured to the roller with hook and loop fasteners, and is sized to the patient by the operator of the device. Kelly, Chest Compression Apparatus for Cardiac Arrest, U.S. Pat. No. 5,738,637 (Apr. 14, 1998) uses a belt that is bolted at its midpoint to the underside of a backboard, than secured to a scissor-mechanism on the patient's chest with hook and loop fasteners. Belt installation is not convenient in either device. A new, more convenient arrangement of the drive components and belt is disclosed in this application.

Another feature of our AUTOPULSE® CPR chest compression device is the ability of the control system to hold the compression belt at the height of compression. The AUTOPULSE® can operate to perform compression in repeated compression cycles comprising a compression stroke, a high compression hold, a release period, and an inter-compression hold. No other automated CPR chest compression device is capable of holding compressions at a high threshold of compression. The method of operating the AUTOPULSE® device to accomplish compressions in cycles of compression, hold, and release is covered by our previous patent, Sherman, et al., Modular CPR assist device to hold at a threshold of tightness, U.S. Pat. No. 7,374,548 (May 20, 2008). The holding periods are accomplished with a brake operably connected to the motor drive shaft of the device, which can be energized to stop the drive shaft to lock the belt in place about the patient. A new, more energy-efficient braking system is disclosed in this application.

On occasion, a chest compression device must be used on a patient at the same time that doctors want to take x-rays of the patient's chest. This is not possible if the radiopaque metal components of the chest compression device (the motor and drive train) are located directly under the load distributing portion of the compression belt, which overlies the patient's chest and heart when properly installed, so that the radiopaque component are also located under the heart. This means that radiopaque component are in the field of view of the x-ray machine.

SUMMARY

The devices and methods described below provide for a belt-driven chest compression device in which the compression belt is readily replaceable. The chest compression device includes a platform which houses drive components, and a compression belt which is connected to the drive components through releasably attachable couplings near the upper surface of the device. Removal and replacement of the belt may be accomplished while a patient is disposed on the housing. This arrangement helps avoid twisting of the belt and facilitates removal and replacement of the belt. Installation of the belt is simpler than our prior AUTOPULSE® device, and is tensioned upon installation by the user. To ensure that compression cycles start from an optimum low level of tightness, without slack, the control system of the device may control the device to loosen the belt upon start-up and thereafter draw the belt to the slack take-up position, or to tighten the belt upon start-up while monitoring an indicator of tightness (motor current, load on a load cell, strain on the belt), and conditionally tighten the belt to a slack take-up position (if the belt is loose initially) or reverse and loosen the belt and then tighten the belt while monitoring an indicator of tightness, to tighten the belt to a slack take-up position (if the initial tightness exceeds the desired tightness of a slack take-up position).

A brake is used to provide the holding periods during operation of the device. The brake comprises a parking pawl, with a pawl and park gear arrangement, with a park gear fixed to a component in the drive train, and a pawl operable to obstruct the park gear.

The arrangement of components in the device provides for a radiolucent region of the device, which underlies the heart of the patient when the device is installed properly on a cardiac arrest victim. For example, the compression belt may be driven by laterally located drive spools, which extend superiorly in the device to drive train components disposed superiorly to the compression belt (and, thus, superiorly to the heart of the patient when the device is installed).

DETAILED DESCRIPTION OF THE INVENTIONS

Figure 1:
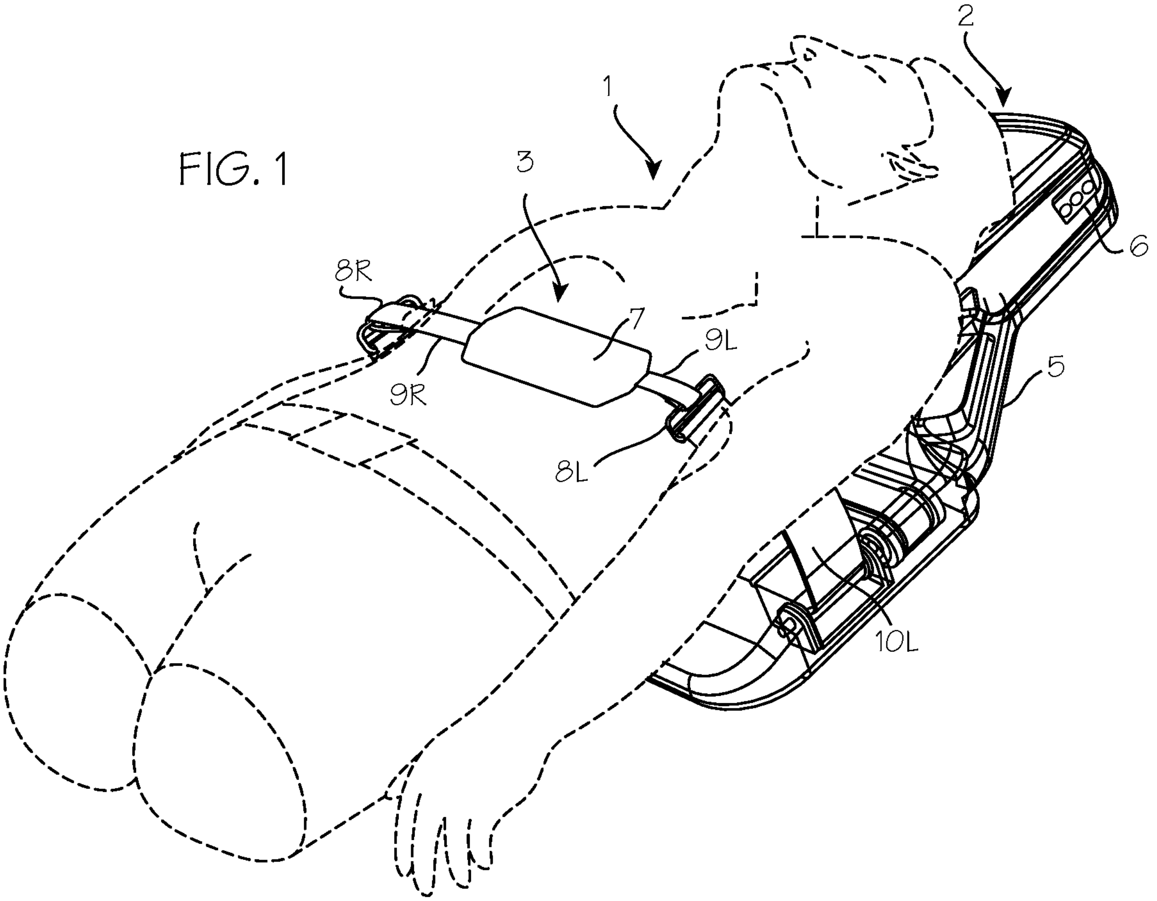
FIG. 1 illustrates the CPR chest compression device installed on a patient.

FIG. 1 shows the chest compression device fitted on a patient 1. The chest compression device 2 applies compressions with the compression belt 3. The chest compression device 2 includes a belt drive platform 4 sized for placement under the thorax of the patient, upon which the patient rests during use and which provides a housing 5 for the drive train and control system for the device. The control system, embedded anywhere in the device, can include a processor and may be operable to control tightening operation of the belt and to provide output on a user interface disposed on the housing.

Operation of the device can be initiated and adjusted by a user through a control panel 6 and a display operated by the control system to provide feedback regarding the status of the device to the user.

The belt includes a wide load-distribution section 7 at the mid-portion of the belt and left and right belt ends SR and 8L (shown in the illustration as narrow pull straps 9R and 9L), which serve as tensioning portions which extend from the load distributing portion, posteriorly relative to the patient, to drive spools within the housing. The left and right belt ends are secured to intermediate straps 10R and 10L, with loops 11R and 11L (for example, square loops, as illustrated). When fitted on a patient, the load distribution section is disposed over the anterior chest wall of the patient, and the left and right belt ends extend posteriorly over the right and left axilla of the patient to connect to their respective lateral drive spools shown in FIG. 2.

Figure 2:
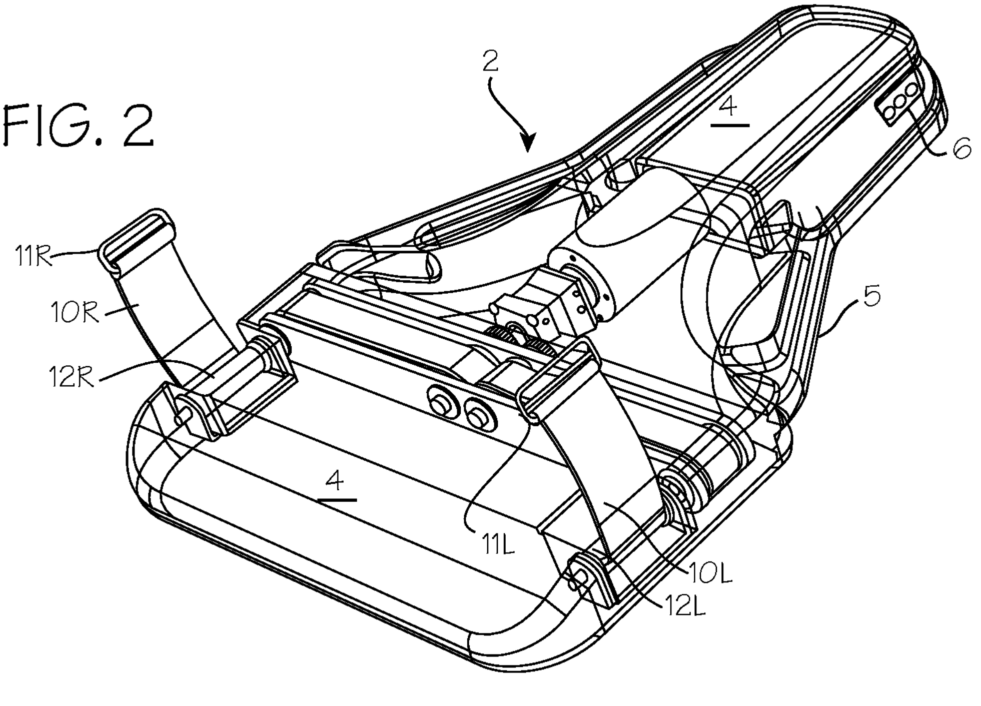
FIG. 2 is a perspective view of the CPR chest compression device, illustrating the connection between the compression belt and intermediate straps at a point above the housing.

FIG. 2 shows the chest compression device in isolation, including the belt drive platform and housing. As illustrated in FIG. 2, the intermediate straps 10R and 10L are secured at one end to the loops, and secured at the other end to planetary drive spools 12R and 12L disposed laterally on either side of the housing. The planetary or lateral drive spools are in turn driven by a motor also dispose within the housing, through various belts and gears described below. The intermediate straps are attached to the planetary or lateral spools such that, upon rotation of the spools, the intermediate straps are pulled posteriorly, spooled upon the lateral spools, thereby drawing the compression belt downward to compress the chest of the patient. The intermediate straps can be fixed to the planetary or lateral drive spools in any suitable manner. The intermediate straps may be flexible and floppy, or they may be self-supporting (that is, they remain in vertical orientation, without other support, when the platform is horizontal) so long as they are still flexible enough so they may be wrapped around the drive spools.

Figure 3:
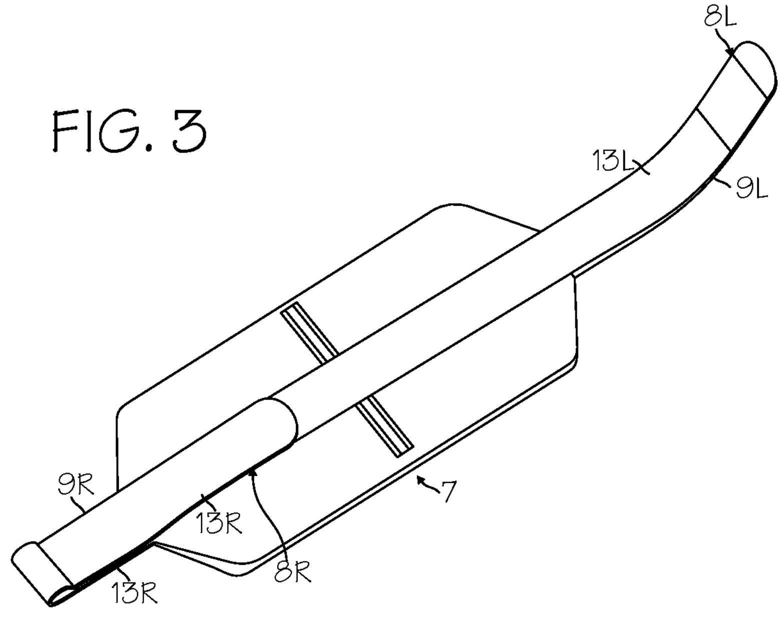
FIG. 3 illustrates the single-piece compression belt which may be used in the compression device of FIG. 1.

The belt 3, as shown in FIG. 3, comprises the load distribution section 7 and left and right belt ends 8R and 8L in the form of left and right pull straps 9R and 9L. The load distribution section is sized and dimensioned to cover a significant portion of the anterior surface of a typical patient's chest. The pull straps are narrow, relative to the load distribution section, to limit material requirements of the associated spools, but the belt ends may be made in the same width as the load distribution section. Corresponding hook sections and loop sections (13R, 13L) on the left and right belt ends secure the compression belt to the loops (11R, 11L) and thus to the intermediate straps 10R and 10L. The pull straps are fitted through the loops, folded together and secured with hook and loop fasteners or other releasable attachment system (that is, attachment systems that can be operated to quickly attach and detach the two parts without tools). The hook and loop fasteners together with the loops provide a convenient means for releasably securing the compression belt to the intermediate straps, in conjunction with double loop sliders illustrated in FIG. 1, but other convenient means of releasably attaching the belt ends to the intermediate straps may be used (such as matching center release buckle components (seat belt buckles), side release buckles (back pack buckles) cam buckles, belt buckles, etc. may be used). One size belt may be used for patients of various sizes, or belts of various sizes can be provided for use with the device depending on the size of the patient. The initial tightness of the belt is established by a CPR provider who pulls the straps through the double loop sliders and attaches hook and loop segments together (the system may establish a slack take-up position for the belt, as described below, after the CPR provider has secured the belt to the buckles). The belt is preferably a one-piece belt, but can be provided as a two-piece belt with overlapping load-distribution sections which can be applied by first laying one side over the patient's chest and next laying the other side over the first side, and securing the two sections together (with, for example, corresponding hook and loop fasteners). A bladder may be incorporated into the load-distribution section 7.

The belt ends may be attached directly to the drive spools, using a spline and slot arrangement disclosed in our prior U.S. Patent, Quintana, et al., Methods And Devices For Attaching A Belt Cartridge To A Chest Compression Device, U.S. Pat. No. 8,740,823 (Jun. 3, 2014). The belt ends may be attached directly to the drive spools using any suitable fastener, clamp or connecting means.

The drive spools have a first segment engaging the drive belts, and a second segment, extending inferiorly from the first segment, which engages the intermediate straps or belt ends. The space between the drive spools, on a corresponding coronal plane and inferior to the drive belts, is unoccupied by drive train components or other radiopaque components and thus constitutes the radiolucent window mentioned above.

In use, a CPR provider will apply the compression device to a cardiac arrest victim. The CPR provider will place the cardiac arrest victim on the housing 5, and secure the belt ends 8R and 8L to the respective left and right intermediate straps (or directly to the drive spools), with the patient already on the anterior surface of the housing, so that there is no need for access to the bottom surface of the device. Where the compression belt is a one-piece belt, at least one of the belt ends is secured to its corresponding intermediate strap after the patient is placed on the platform. With the belt in place, the CPR provider initiates operation of the chest compression device to repeatedly compress the chest of the patient to a depth and at a rate suitable for resuscitation. If the belt must be replaced after the patient is placed on the platform, the CPR provider can readily detach the compression belt from the intermediate straps and install a new compression belt by securing the belt end of the new compression belt to the intermediate straps. This can be done without removing the patient from the housing, which saves a significant amount of time compared to prior art systems and minimizes the delay in initiating chest compressions attendant to belt replacement. With the belt in place, the CPR provider initiates operation of the device to cause repeated cycles of tightening and loosening of the belt about the thorax of the patient. Should the belt become damaged, or twisted during use (the front-loading device should make twisting less likely), the CPR provider interrupts operation of the device to replace the belt, detaches the right belt end from the right intermediate strap or right drive spool, and detaches the left belt end from left intermediate straps or the left drive spool, while the patient remains on the platform.

The benefits of the compression belt and intermediate straps arrangement, with a releasable attachment to the intermediate straps, can be achieved in combination with the benefits of additional inventions described below, or they may be achieved in isolation.

Figure 4:
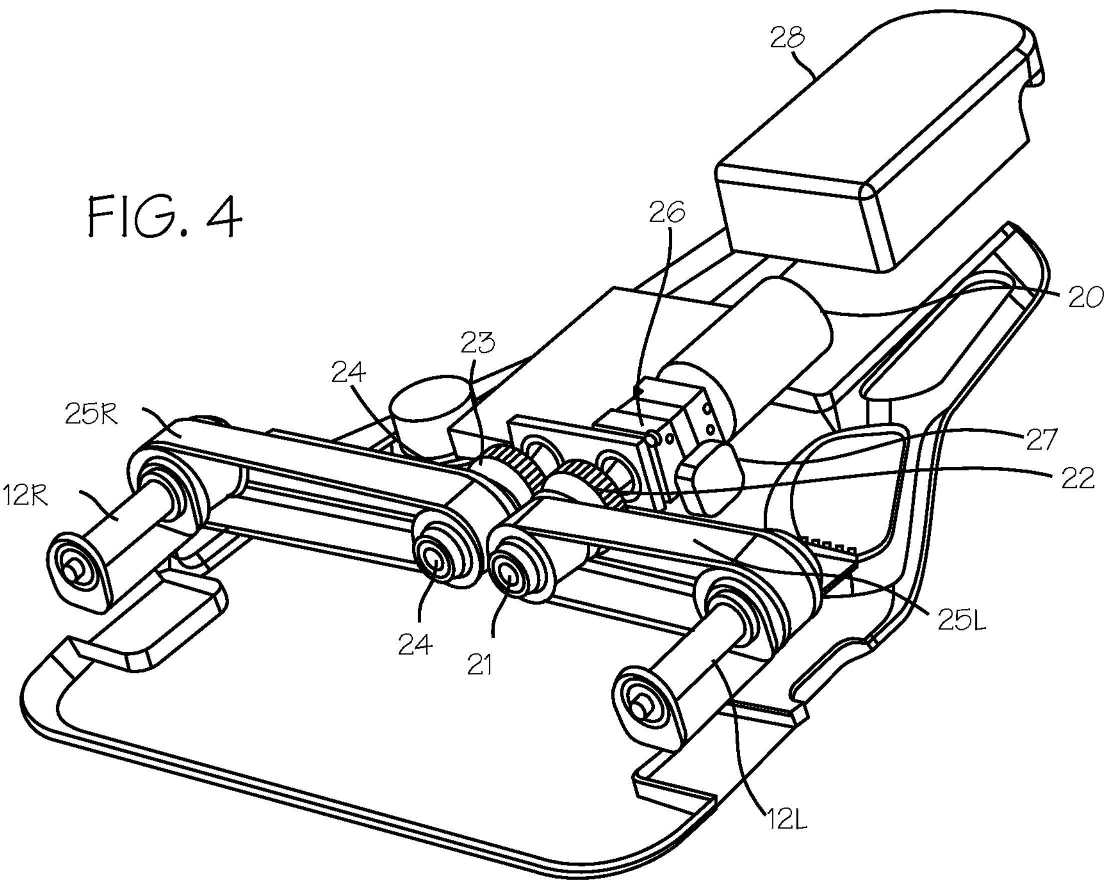
FIG. 4 is a perspective view of drive train of the compression device, including the motor and drive shaft, drive belts, and secondary or planetary drive spools.

FIG. 4 is a perspective view of drive train of the compression device, including the drive shaft, drive belts, and planetary drive spools, which operably connects the motor 20 and its motor shaft to the compression belt. The drive train comprises a first drive shaft 21 (in this case, an extension of the motor shaft or the output shaft of any reduction gears) and a first gear 22 (a sun gear) which in turn is fixed to the first drive shaft. The first/sun gear engages a second/planetary gear 23 which in turn is fixed to a second drive shaft 24. (The motor shaft, first and second drive shafts, gears and drive spools are supported in a channel beam which extends across the device, providing support for the components and the housing.) Rotation of the first drive shaft 21 in one direction results in counter-rotation (rotation in the opposite direction) of the second drive shaft 24. The first and second drive shafts thus rotate in opposite directions. The first and second drive shafts 21 (left) and 24 (right) are connected to the first and second lateral drive spools 12R and 12L through drive belts 25R and 25L, such that rotation of the first and second shafts results in rotation of the first and second lateral drive spools, which in turn spool the intermediate straps to cause tightening of the compression belt about the chest of the patient. As illustrated in FIG. 4, the drive shafts may comprise toothed wheels (driving pulleys) and the drive spools may comprise toothed wheels (driven pulleys), and the drive belt is a toothed drive belt. The motor shaft can be connected to the first drive shaft 21 directly or through reduction gears in a gear box 26. A brake 27 may be operably connected to the drive train at any appropriate point, and several embodiments of preferred brakes are shown in more detail in FIGS. 11, 12 and 13.

As depicted in FIG. 4, the drive shafts 21 (left) and 24 (right) are disposed asymmetrically about the inferior/superior centerline of the device, but the drive spools may be disposed symmetrically. The belts provide a convenient linkage between the toothed wheels, and may be replaced with comparable components such as chains, with corresponding sprockets on the drive shafts (21, 24) and first and second lateral drive spools 12R and 12L, or worm gears interconnecting drive shaft (or shafts) with the lateral drive spools.

In the arrangement of FIG. 4, a single motor is used to drive both drive shafts and both drive spools, without a direct connection to the compression belt, which is one system which enables the anterior releasable attachment system for the compression belt. In this arrangement, the motor 20, battery 28, and control system are located superiorly to the portion of the lateral drive spools 12R and 12L to which the intermediate straps or belt ends are secured (in our current AUTOPULSE® compression device, the motor drive shaft is located on the same transverse plane as the lateral spindles) thus leaving an open, unoccupied space in the inferior portion of the device which is devoid of radiopaque components. This open, unoccupied space is located beneath (posterior to) the load distributing band.

Thus, when the compression device is installed on the patient, this unoccupied space is located under the heart of the patient, and provides a clear, radiolucent window for imaging the heart with fluoroscopy, x-rays or CT scanning. When installed on the patient, motor and drive shafts which drive the belts are located superiorly to the region of the housing underlying the compression belt, corresponding to the region of the patient's heart, and the drive spools, though they extend inferiorly into the superior/inferior level of the heart, are laterally displaced from the centerline of the housing (and, correspondingly, from the centerline of the patient's body). The benefits of the drive train illustrated in FIG. 4 can be obtained in combination with the front-loaded compression belt of FIG. 1, or with other belt attachment mechanisms. Also, the benefits of the radiolucent window can be achieved with other arrangements of the drive train, so long as the drive train components are displaced from the area of the platform which underlies the patient's heart during use (for example, two motors may be used, with one motor operably connected to each drive spool, or directly to each drive shaft).

Figure 5:
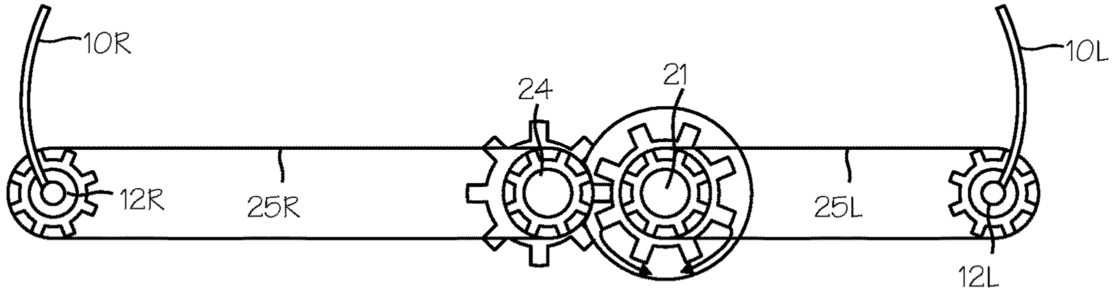
FIG. 5 is an end view of drive spool, drive belts, and secondary drive spools.

FIG. 5 is an end view of the drive shaft (from the inferior end of the device), drive belts, and secondary drive spools shown in FIG. 4, including the drive shafts 21 (left) and 24 (right), lateral drive spools 12R and 12L, drive belts 25R and 25L and the motor 20. During the compression stroke, the motor is operated to turn each drive spool sufficiently to pull the intermediates straps downward to the extent necessary to achieve compression at the desired depth. This may vary with the diameter of the drive spools. Preferably, the drive spools 12R and 12L are about 0.75" (2 cm) in diameter, and rotate about 2.5 rotations on each compression stroke (drive spool 12R will rotate counter-clockwise when viewed from the inferior view of FIG. 5 and drive spool 12L will rotate clockwise, in this arrangement) to pull the intermediate straps downwardly (posteriorly, relative to a patient laying supine on the housing) about 1 to 2 inches (2.5 to 5 cm) to obtain a chest compression of the desired depth of 2 inches (5 cm). The drive spools 12R and 12L may be made with a larger diameter, such that it takes less rotation, such as half of a complete rotation, to spool the intermediate straps only partially around the drive spools, to pull the intermediate straps downward to the extent necessary for adequate compression. In this arrangement, the intermediate straps can be made of a fairly stiff material, such that they are self-supporting and stand vertically above the housing when not attached to the belt.

Figure 6:
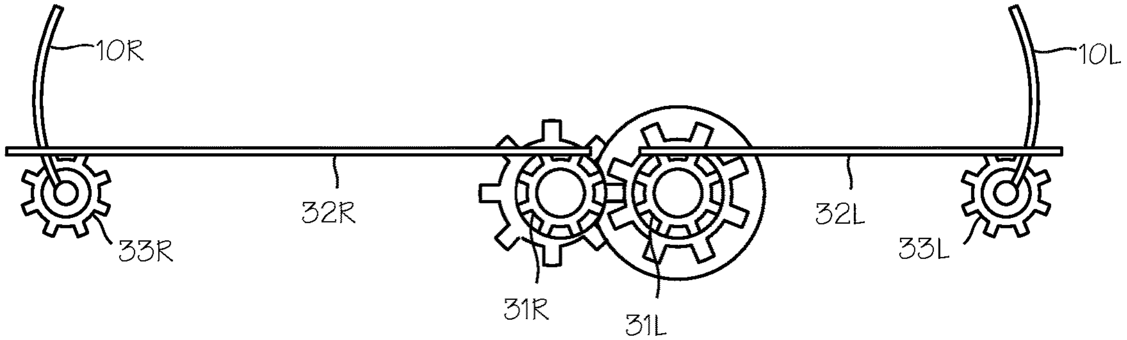
FIGS. 6, 7, 8, 9 and 10 illustrate alternative drive trains for rotating the drive spools.
Figure 7:
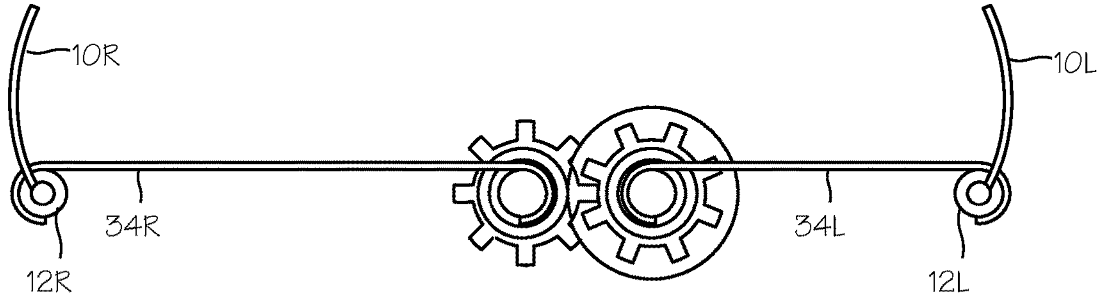
Figure 8:
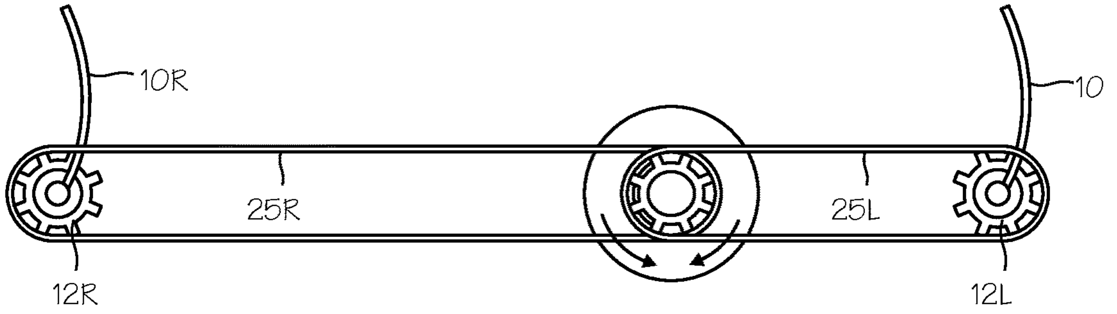

The drive train can be varied, while still achieving the benefits of arrangement which permits attachment of the belt to the drive train from the front or side of the housing. For example, as shown in FIG. 6, the linkage between the drive spools can be provided with a rack and pinion system, with drive pinions (toothed wheels) 31R and 31L, and right and left racks 32R and 32L and right and left driven pinions 33R and 33L. (Various arrangements can be used to properly rotate the drive spools, including a single pinion with a reversing gear at one of the drive spools, or disposition of the belt end/intermediate strap on opposite sides of the drive spools, as shown in FIG. 8.) As shown in FIG. 7, the linkage between the drive shafts can drive the left and right drive shafts and the left and right drive spools 12R and 12L through drive straps 34R and 34L. The drive straps in this system spool about the drive shafts, and also about the left and right drive spools 12R and 12L (a single drive shaft may be used in this embodiment).

In operation, rotation of the drive shafts will result in spooling of the drive straps 34R and 34L on the drive shafts 31R and 31L, which will result in rotation of drive spools 12R and 12L, and thus result in tightening of the compression belt. This system may use the natural resilience of the chest to expand the compression belt in the release phase of the compression cycle, while the motor operates to allow unspooling of the drive straps 34R and 34L about the drive shafts 31R and 31L coincident with the spooling of the drive straps 34R and 34L about the drive spools 12R and 12L.

FIG. 8 shows a drive train in which both the right and left belts are driven by a single drive shaft, with each drive belt causing rotation of its associated drive spool in opposite directions, with one of the drive spool/intermediate strap connections disposed on the inside (medial) portion of the drive spool to ensure that rotation of the drive spool results in spooling of the intermediate strap on the drive spool. Each of these drive trains can be used in a system in which the compression belt is releasably or permanently attached to the drive train from the front of the device, or the side of the device, thus allowing installation, removal and replacement of the belt while the patient is on the platform. (Analogous to the usage relating to automobiles, the drive train is the group of components that operate to deliver power to the belt, exclusive of the motor).

Figure 9:
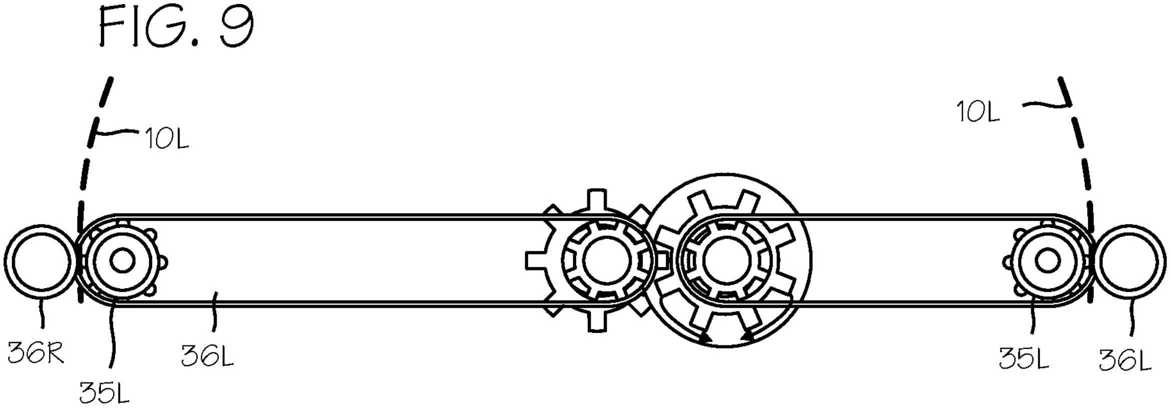

FIG. 9 shows a drive train similar to the drive train of FIG. 5, in which the lateral drive spools 12R and 12L of FIG. 5 are replaced with sprocketed spools 35R and 35L. The sprocketed spools engage corresponding perforations in the intermediate straps, and pull the intermediate straps downward when rotated in a first direction, thus tightening the belt, and push the intermediate straps upward when rotated in the opposite direction, thus loosening the belt. Corresponding tensioning spools 36R and 36L are provided immediately adjacent to the sprocketed spools 35R and 35L, to force the perforated intermediate straps into engagement with a sprocket of the sprocketed spools.

In each of the drive trains illustrates in FIGS. 5 through 9, levers may be used in lieu of a large diameter drive spool, and would function to pull the intermediate straps posteriorly. Levers attached to the intermediate straps, driven by the same mechanisms proposed for the lateral drive spools, will pull the intermediate straps posteriorly to tighten the belt.

Figure 10:
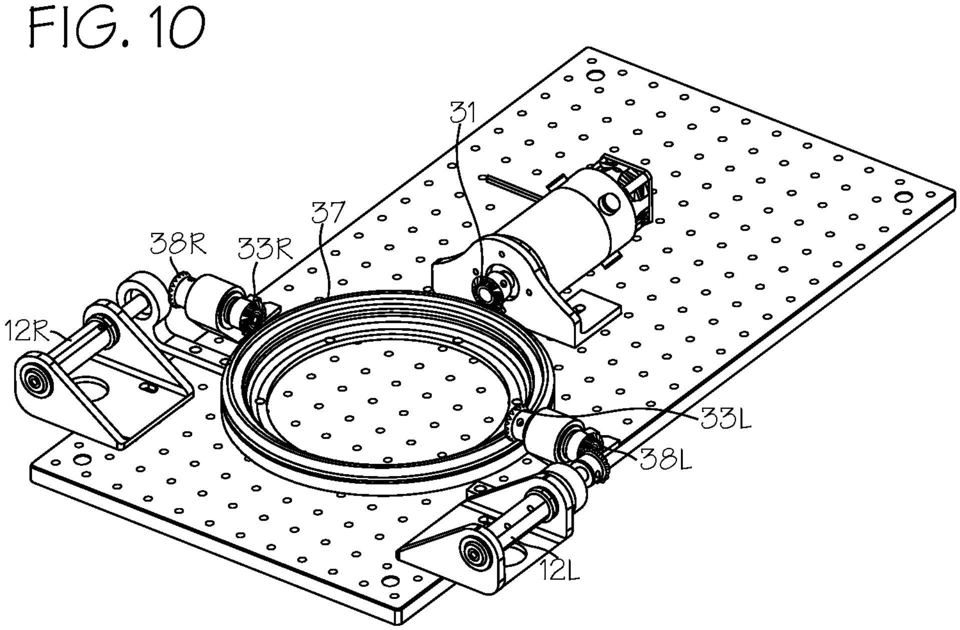

FIG. 10 shows a drive train for driving the compression belt using a ring gear and pinion. In this system, the ring gear 37 takes the place of the rack of the drive train of FIG. 6 described above, to transfer power from the motor and drive shaft to the lateral drive spools. In this system, drive pinion 31 drives the ring gear, in alternating clockwise and counterclockwise rotations, which in turn drive the driven pinions 33R and 33L and their translating output pinions 38R and 38L, which in turn drive the drive spools 12R and 12L in back and forth rotations to pull down and push up, or spool and unspool, the intermediate straps 10R and 10L (not shown). The ring gear is preferably located superiorly to the inferior portion of the drive spools which engage the intermediate straps, so that, when a patient is disposed on the device, with the belt properly positioned over the thorax, the ring gear does not lie in the region of the housing which underlies the patient's heart.

Finally, the drive spools can be replaced with any convenient lever mechanism, driven through appropriate linkages by the motor, and operable to pull the intermediate straps downwardly and push the intermediate straps upwardly (or at least allow upward motion on recoil of the patient's thorax), while obtaining the benefit of maintaining an empty space in the "heart" region of the housing. The spools, however, are a convenient implementation of a levering mechanism.

Figure 11:
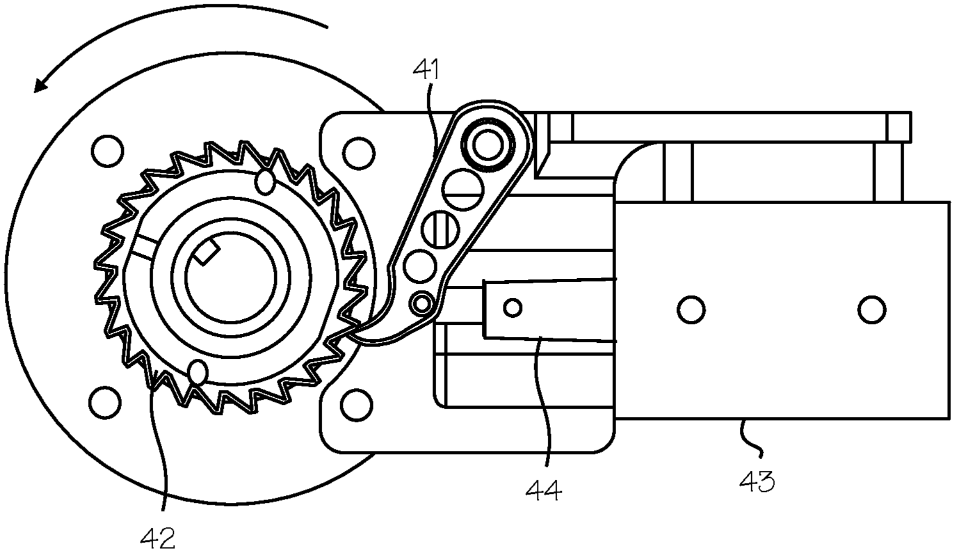
FIGS. 11, 12 and 13 illustrate improved braking mechanisms for use with the drive train of FIG. 4 and other chest compression devices.

The compression device preferably operates to provide cycles of compression which include a compression downstroke, a high compression hold, a release period, and an inter-compression hold. The hold periods are accomplished through operation of a brake operable to very quickly stop the rotating components of the drive train. Any brake may be used, including the cam brake or wrap spring brake previously proposed for use in a chest compression device, or the motor can be stalled or electronically balanced to hold it during hold periods. FIG. 11 illustrates an improved braking mechanism that may be used with the drive train of FIG. 4. The braking mechanism comprises a parking pawl mechanism, similar to parking pawls used in automotive transmissions. The parking pawl 41 and associated park gear (a notched wheel or ratchet wheel) 42 can be located at any point in the drive train or motor shaft, with the park gear non-rotatably fixed to any rotating component, and is shown in FIG. 11 fixed to the motor shaft 21, between the motor 20 and the gear box 26. The pawl 41 is operated by a solenoid actuator 43 and solenoid plunger 44 or other actuator (for example, a motor may be used to swing the pawl into contact with the park gear), which is fixed relative to the drive shaft. To brake and stop the drive train the control system operates the solenoid to force the pawl into interfering contact with the park gear, and to release the drive train the control system operates the solenoid to withdraw the pawl from the park gear.

Preferably, the pawl is spring-biased away from the park gear, so that if the solenoid fails the pawl will be withdrawn from interference with the park gear. In this case, the solenoid is operated to force the pawl toward the park gear during the entire hold period. Alternatively, the pawl is shifted by action of a spring into interfering contact, and remains in interfering contact until the solenoid is powered to withdraw the pawl, so that battery power is not needed to hold the pawl in interfering contact. Alternatively, the pawl may be unbiased, so that, after being shifted by action of the solenoid into interfering contact, it remains in its interfering position until withdrawn, so that battery power need not be consumed to hold the brake in position (but may be applied to hold the brake in position), and is only applied to shift the pawl into interfering contact with the park gear and withdraw the pawl.

Figure 12:
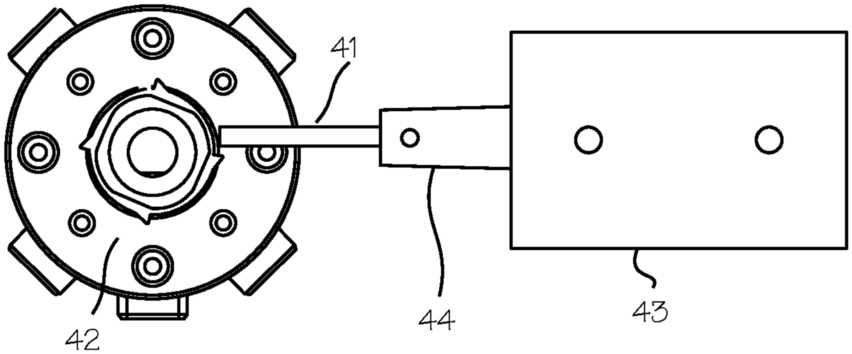
Figure 13:
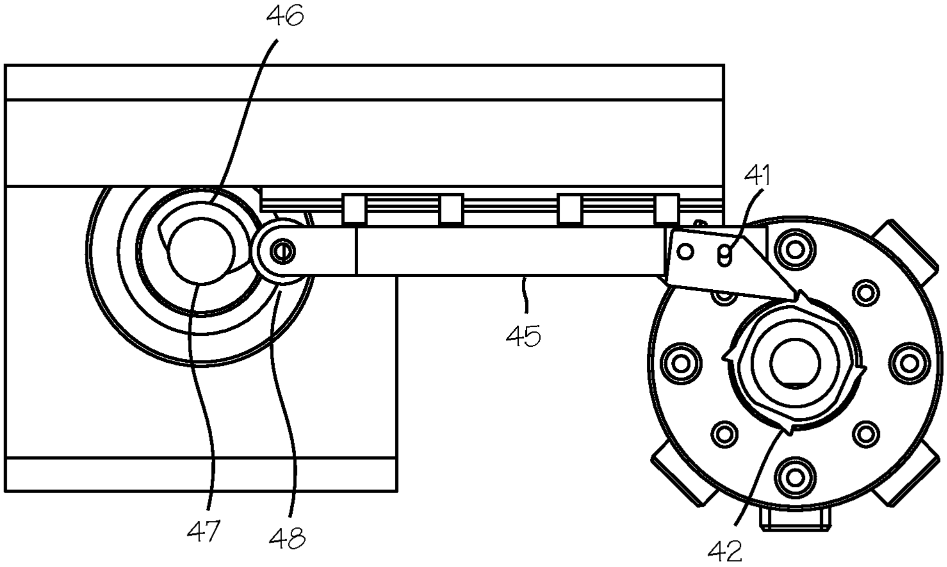

Various parking pawl mechanisms may be used. As illustrated in FIG. 12, another suitable parking pawl mechanism includes the park gear 42, the solenoid plunger 44 and pawl 41 which directly engages the park gear and serves as the pawl. To brake and stop the drive train the control system operates the solenoid to force the pawl into interfering contact with the park gear, and to release the drive train the control system operates the solenoid to withdraw the pawl from the park gear. As illustrated in FIG. 13, another suitable parking pawl mechanism includes the park gear 42, a sliding pawl 45, and cam 46. The cam is turned with a rotary solenoid 47, which engages the follower 48 to push the pawl into interfering contact with the park gear. The cam may have an eccentric profile, however the portion of the cam lobe in contact with the follower when the cam is in the locked and/or unlocked position is circular (for example, a non-circular cam lobe with an isodiametric top radius, where a radius of a contact point with the follower is a substantially fixed radius relative to the cam shaft) so that forces applied to the cam by the follower will not cause the cam to rotate. This allows the cam lobe portions associated with locking and unlocking to maintain a stable position. The follower rests on an equal radial segment or portion of the cam lobe during engagement of the pawl with the park gear to maintain a stable position and minimize disengagement force to release the park gear. If the motor is powered in the locked position, the power required to rotate the cam to unlock the pawl is constant, minimized and/or decreasing. Once the pawl is forced into interfering contact with the park gear, no battery power is required to hold the pawl in interfering contact with the park gear. Power is required to disengage the pawl, but no battery power is required to hold the pawl away from the park gear. The pawls of the braking mechanisms are controlled by the control system, which is further programmed to operate the solenoid to force the pawl into interfering contact with the pawl gear to brake the drive train, and thus hold the compression belt at a set threshold of tightness during a period of the compression cycle, such as the high compression hold period of the compression cycle or the inter-compression hold period of the compression cycle. Once the pawl is forced into interfering contact with the park gear, no battery power is required to hold the pawl in interfering contact with the park gear. Power may be required to disengage the pawl, but no battery power is required to hold the pawl away from the park gear.

In use, a CPR provider will apply the device to a cardiac arrest victim, and initiate operation of the device. In applying the device, the CPR provider will secure each belt end to its corresponding intermediate belt (or directly to a corresponding drive spool). Initial tightness of the belt is not critical, as the control system will operate to cinch the belt to achieve an appropriate tightness for the start of compressions. After placement of the belt, the CPR provider initiates operation of the device through the control panel. Upon initiation, the control system will first test the tightness of the belt. To accomplish this, the control system is programmed to first loosen the belt (the intermediate straps will be set to a position to provide enough band length to accommodate this, and can be initially partially spooled) to ensure that it is slack, then tighten the belt until it sensed that the belt is tight to a first, low threshold of tightness (a slack-take up position or pre-tensioned position). The control system will sense this through a suitable system, such as a current sensor, associating a spike in current drawn by the motor with the slack take-up position. When the belt is tight to the point where any slack has been taken up, the motor will require more current to continue to turn under the load of compressing the chest. The expected rapid increase in motor current draw (motor threshold current draw), is measured through a current sensor, a voltage divider circuit or the like. This spike in current or voltage is taken as the signal that the belt has been drawn tightly upon the patient and the paid-out belt length is an appropriate starting point. (The exact current level which indicates that the motor has encountered resistance consistent with slack take-up will vary depending on the motor used and the mass of the many components of the system.) An encoder measurement at this point is zeroed within the system (that is, taken as the starting point for belt take-up). The encoder then provides information used by the system to determine the change in length of the belt from this pre-tightened or “pre-tensioned” position.

Various other means for detecting slack take-up may be used. The control system can also determine the slack-take up position by analyzing an encoder scale on a moving component of the system (associating a slow down in belt motion with the slack take-up position), a load sensor on the platform (associating a rapid change in sensed load with the slack take-up position), or with any other means for sensing slack take-up.

As an alternative mode of operation, the control system can be programmed to initially tighten the belt while detecting the load on the belt through a motor current sensor, and, upon detecting a load in excess of a predetermined threshold, loosening the belt to slack and then tightening the belt to detect the slack take-up position, or, upon detecting the load below the predetermined threshold, continue to tighten the belt to the slack take-up position.

Figure 14:
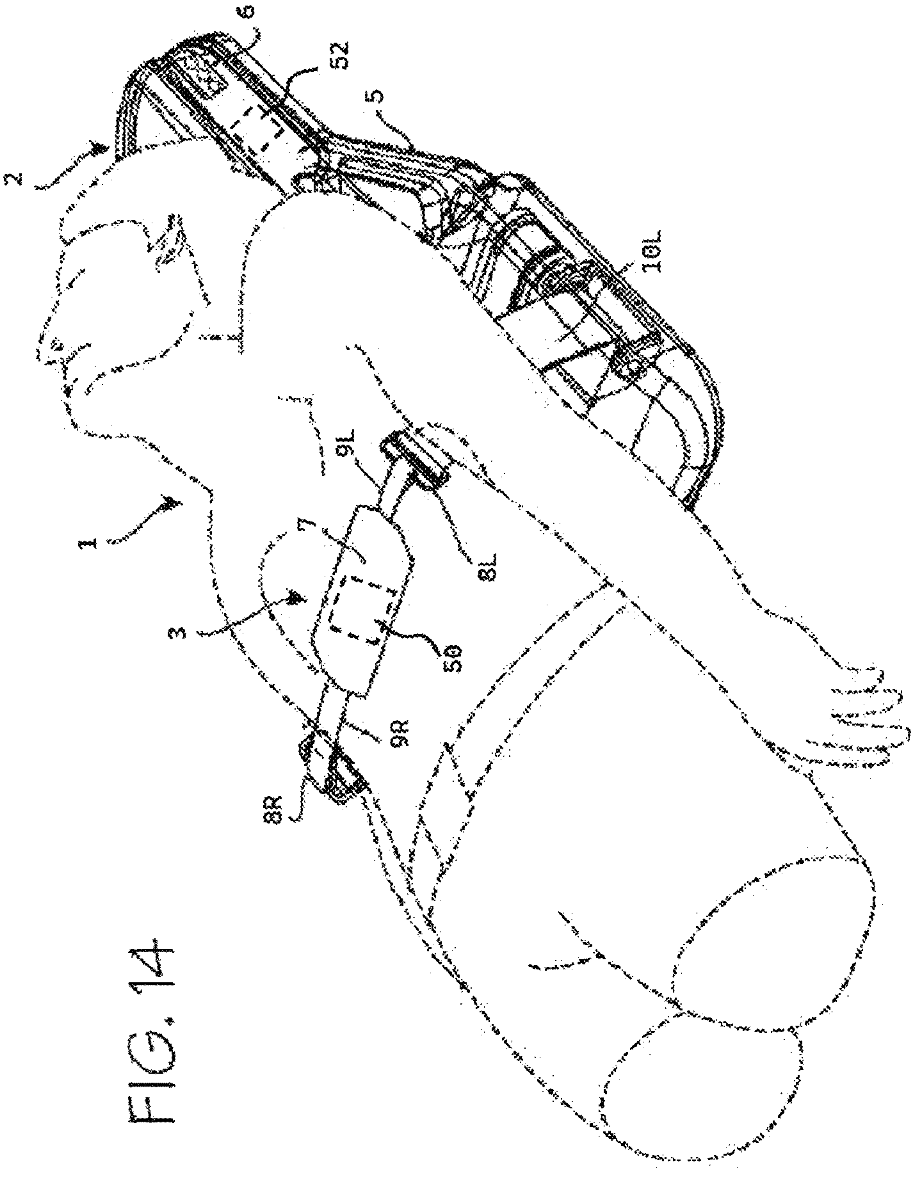
FIG. 14 illustrates another embodiment of a CPR chest compression device installed on a patient.

Once the slack take-up position is achieved, the control system associates the belt position with the slack take-up position. This can be achieved by detecting an encoder position of an encoder, and associating the encoder position with the slack take-up position of the belt, or detecting the position of a compression monitor fixed to the belt and associating this position with the slack take-up position of the belt. If the encoder position is used to track the unspooled length of the belt, which corresponds to the desired compression depth, the control system will be programmed to operate the motor and brake to provide repeated compression cycles which include tightening the belt to a high threshold of tightness (based upon the length of belt spooled on the lateral drive spool, which corresponds to the compression depth achieved), holding the belt tight momentarily at the high threshold, loosening the belt, and holding the belt at the slack take-up position momentarily, where the slack take-up position has been determined in reference to the encoder position. If a compression monitor, such as a compression monitor 50 of FIG. 14, is used to track the compression depth achieved by the compression device, the control system will be programmed to operate the motor and brake to provide repeated compression cycles which include tightening the belt to a high threshold of tightness (based on the compression depth as measured by the compression monitor, or determined from signals generated by the compression monitor), holding the belt tight momentarily at the high threshold, loosening the belt, and holding the belt at the slack take-up position momentarily, where the slack take-up position has been determined in reference to the compression monitor zero point which was associated with the slack take-up position.

Where a compression monitor, such as the compression monitor 52 of FIG. 14, is used to determine the compression state achieved by the system and provide feedback for control of the system, a compression sensor, such as compression sensor 50 of FIG. 14, can comprise an accelerometer based compression monitor such as the compression monitor described in Halperin, et al., CPR Chest Compression Monitor, U.S. Pat. No. 6,390,996 (May 21, 2002), as well as Palazzolo, et al., Method of Determining Depth of Chest Compressions During CPR, U.S. Pat. No. 7,122,014 (Oct. 17, 2006), or the magnetic field based compression monitor described in Centen, et al., Reference Sensor For CPR Feedback Device, U.S. Pub. 2012/0083720 (Apr. 5, 2012). The compression monitor typically includes sensors for generating signals corresponding to the depth of compression achieved during CPR compressions, and associated hardware/control system for determining the depth of compression based on these signals. The components of the compression monitor system may be incorporated into the belt, or the sensors may be incorporated into the belt while the associated hardware and control system are located elsewhere in the device, or integrated into the main control system that operates the compression belt. While controlling the device to perform repeated cycles of compression, the control system may use the compression signals or depth measurement provided by the compression sensor (e.g., compression sensor 50 of FIG. 14) or compression monitor (e.g., compression monitor 52 of FIG. 14) to control operation of the device. The control system can operate to tighten the belt until the depth of compression achieved by the system, as determined from the compression signals, indicates that the compression belt has pushed the anterior chest wall downward (in the anterior direction, toward the spine) to a desired predetermined compression depth (typically 1.5 to 2.5 inches). The desired depth is predetermined in the sense that it is programmed into the control system, or determined by the control system, or input by an operator of the system).

The control system may comprise at least one processor and at least one memory including program code with the memory and computer program code configured with the processor to cause the system to perform the functions described throughout this specification. The various functions of the control system may be accomplished in a single computer or multiple computers, and may be accomplished by a general purpose computer or a dedicated computer, and may be housed in the housing or an associated defibrillator.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A device for compressing a chest of a patient comprising:

a platform for placement under a thorax of the patient;

a compression belt adapted to extend over an anterior chest wall of the patient, the belt comprising a right belt end and a left belt end;

a drive train comprising a right drive spool and a left drive spool;

a motor operably connected to the belt through the drive train, the motor operatively coupled to the drive train to cause the belt to tighten and loosen about the thorax of the patient, wherein the right belt end and the left belt end are directly and releasably attachable to the right drive spool and left drive spool, respectively, at corresponding attachment points that are accessible from anterior or lateral sides of the platform, while the platform is disposed under the patient.

2. The device of claim 1, further comprising right and left splines disposed on the respective right and left belt ends, and slots in the respective right and left drive spools for receiving the corresponding right and left splines to releasably attach the right and left belt ends to the right and left drive spools.

3. The device of claim 1, further comprising a control device operable to control operation of the motor to tighten and loosen the compression belt in repeated cycles of compression about the thorax of the patient, and the control device is further operable to pre-tension the compression belt, prior to performing the repeated cycles of compression, by first operating the motor to loosen the belt, and then operating the motor to tighten the belt until the belt is tightened to a slack take-position.

4. The device of claim 3, further comprising a compression monitor with sensors secured to the compression belt, the compression monitor operable to determine a depth of compression achieved by the chest compression device, wherein the control device is further programmed to control operation of the compression belt based on the chest compression depth determined by the compression monitor.

5. The device of claim 4, wherein the control device is further programmed to control operation of the compression belt to achieve a predetermined compression depth as determined by the compression monitor.

6. The device of claim 1, wherein the platform comprises an inferior/superior axis corresponding to the inferior/superior axis of a patient on which the device is used, and a medial/lateral axis corresponding to the medial/lateral axis of a patient on which the device is used, wherein:

the motor and drive train are disposed in a first region of the device along the inferior/superior axis, and the drive spools extend into a second region of the device along the inferior/superior axis, the second region displaced from the first region and located inferiorly to the first region; and the drive spools are spaced laterally from the inferior/superior axis of the platform, thereby defining a radiolucent space within the platform devoid of radiopaque components;

such that the radiolucent space is disposed, when the device is installed under a patient with the compression belt spanning the anterior chest wall of the patient, under a heart of the patient.

7. A device for compressing a chest of a patient comprising:

a platform for placement under a thorax of the patient, the platform defining an anterior/posterior axis corresponding to an anterior/posterior axis of the patient;

a compression belt adapted to extend over an anterior chest wall of the patient, the belt comprising right and left belt ends;

right and left drive spools laterally displaced from an inferior/superior axis of the platform, the right and left belt ends directly detachable from the right and left drive spools, respectively, while the platform remains positioned under the patient, the right and left drive spools rotatable to wind the right and left belt ends posteriorly, for repeatedly tightening and loosening the belt around the chest of the patient; and a motor operably connected to the right and left drive spools to rotate the right and left drive spools.

8. The device of claim 7, further comprising a drive train, wherein the drive train comprises a first drive belt, drive chain, rack or strap connecting a first drive shaft to one of the left and right drive spools, and a second drive belt, drive chain, rack or strap connecting a second drive shaft to the other one of the left and right drive spools.

* * * * *